Aug. 2, 1966     F. R. FEDER ETAL     3,263,980
APPARATUS FOR TREATING THERMOPLASTIC MATERIAL TO
IMPROVE FLOWABILITY THEREOF
Filed Feb. 19, 1963
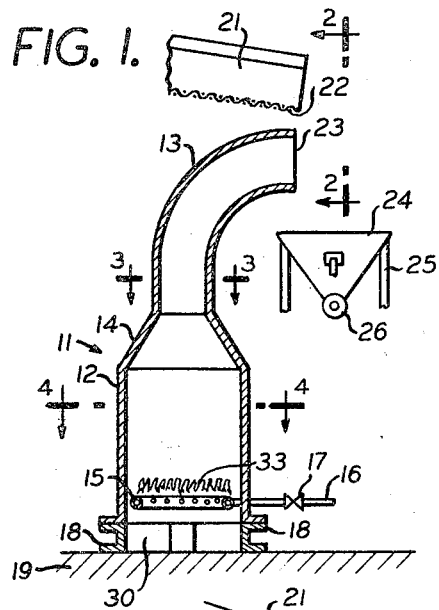
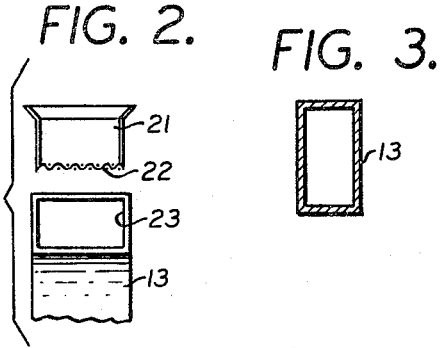
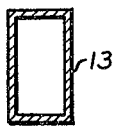
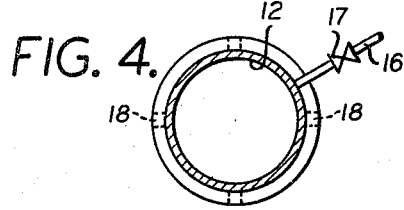
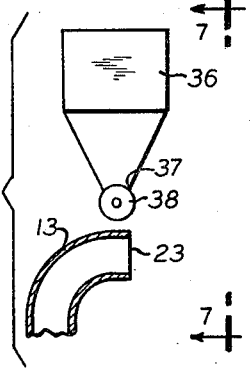
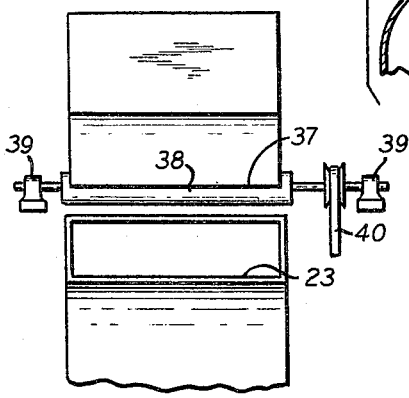
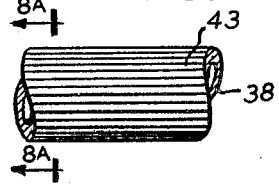
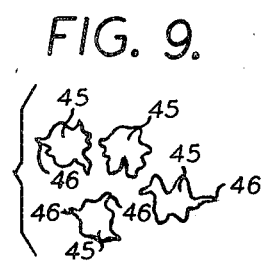
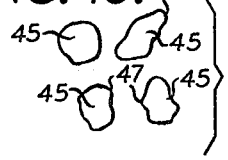
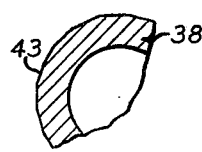
INVENTORS
FRIEDHELM R. FEDER
RICHARD S. HOYT
BY
Frank M. Murphy
ATTORNEY.

United States Patent Office 3,263,980
Patented August 2, 1966

3,263,980
APPARATUS FOR TREATING THERMOPLAS-
TIC MATERIAL TO IMPROVE FLOWABILITY
THEREOF
Friedhelm R. Feder, Westfield, and Richard S. Hoyt, South
Bound Brook, N.J., assignors to Wedco Inc., Garwood,
N.J., a corporation of New Jersey
Filed Feb. 19, 1963, Ser. No. 259,704
4 Claims. (Cl. 263—21)

This invention relates to the treatment of finely divided thermoplastic resin, and has as objects to provide apparatus for improving flowability of such material.

In the production of resins, the product of the reaction wherein the resin is produced is commonly mixed with stabilizers, additives, plasticizers, etc. and this admixture is then worked into a homogeneous material by known processing steps such as simultaneous heating and extrusion of the material. The resulting homogeneous material is granulated to provide pellets which can be up to about one-fourth inch in size. The pellets are packaged and constitute a common material of commerce.

For many services, such as slush molding, rotational molding, fluid bed coating, spray-on coating, coloring (surface coating), rug backing, etc. the pellets are pulverized to provide the material in a finer particle size. The particle size of the pulverized material can be in the range of 100% —12 mesh, 10% —100 mesh to 100% —80 mesh, 10% —200 mesh. Particle sizes outside of this range can be used, though, in general, the particle size of pulverized material will fall within this range. The pulverizing is commonly carried out in attrition mills, for example, disc mills, or pulverizing can be carried out in an impact mill, such as a hammer mill.

In respect to pulverized resin, a problem exists in that the flowability of such material is poor. Accordingly, the handling and utilization of the pulverized material is accompanied by disadvantages occasioned by such properties.

One practice which can be resorted to to obviate the poor flow characteristics of pulverized material is to cold grind the material. In this procedure the resin pellets are ground at a very low temperature, commonly while in admixture with liquid nitrogen.

It is the principal object of the invention to provide improved apparatus for the treating of pulverized material so as to improve the flowability thereof.

It has been found that resins, in particular thermoplastic resins can be treated to improve flowability, by the contacting of pulverized resin while the resin is dispersed, with a hot gas stream. The manner of contacting and the temperature of the gas is such that the surface of the resin particles is heated to a temperature such that softening and flow on the surface portion of the particles occurs, and surface irregularities, as a result, disappear. The dispersed material is then cooled and following cooling is collected into a mass of finely divided material having a flowability improved over that of the starting pulverized material.

Thus, the apparatus of the invention is suitable for treating thermoplastic resin in finely divided form to improve the flowability thereof, the resin particles having relatively sharp pulverized resin protuberances and the resin having poor flow properties. The treatment involves: (a) separating the particles of resin to provide it in dispersed condition; (b) contacting the particles while in dispersed condition with a gas stream at a temperature of about 400–1500° F. for a time sufficient to heat the resin particles to soften at least surface portions thereof, so that the resin of the surface portions flows and protuberances are reduced and the surfaces are smoothened; (c) after the contacting, cooling the particles while in the dispersed condition to harden the surface portion thereof, so that on contact the particles will not agglomerate; and (d) collecting the particles together into a mass thereof in which the particles are in contact with one another, the mass of particles having an improved flowability. The dispersion of particles through which the gas stream is passed is maintained, during the contacting with the gas stream so that substantial contacting of the particles does not occur. Thus, while the particles are in a condition such that the surfaces thereof are in soft state, contacting and resulting agglomeration is avoided. In a preferred procedure of the invention, the particles are dropped so that they form a body of falling particles, and the gas is passed through the body of dispersed particles. Best results are obtained by passing the gas transversely of the body of dispersed particles to provide the contacting and simultaneously increase the distances separating the particles. In such operation, the dispersion is expanded during the contacting with hot gas so that the likelihood of one particle striking another to cause agglomeration, is reduced. The gas can be passed through the dispersion in a direction substantially perpendicular to the direction of travel of the dispersion.

Following the heating, cooling, and collecting, the resin of improved flow property can be caused to flow for utilization in surfaces as mentioned above, namely: slush molding, rotational molding, fluid bed coating, spray-on coating, etc. and in the flow of particles as occurs in such utilization of the resin, the rewards for the treatment of the invention are realized. In many cases the material is caused to flow during the application thereof to a surface to be coated therewith.

As to the resins which can be treated according to the invention, any thermoplastic resin can be treated. Thus, the procedure of the invention is well suited for the treatment of pulverized polyethylene, polypropylene, nylon, Teflon brand polytetrafluoroethylene, Penton brand resin of Hercules Powder Company, polyvinylchloride, and polyacrylates such as polymethylmethacrylate. Thermoplastic copolymers can also be treated according to the invention. The treatment of the invention involves essentially a physical phenomenon, and thus is not dependent on the chemical composition of the material. Any thermoplastic resin can be treated by the procedure of the invention.

The procedure has been found particularly well suited for the treatment of the polyethylene, including high density and low density polyethylene. In the treatment of polyethylene, a preferred temperature range for the hot gas stream is about 500–800° F., better yet, about 600° F. These preferred temperatures are particularly well suited for the treatment of low density polyethylene.

The apparatus provided by the invention comprises: (a) dispersing means for dispersing finely divided particles as a sheet of such particles; (b) hot gas dispensing means disposed below the dispersing means for delivering a stream of hot gas for passage through the sheet of dispersed particles; and (c) collecting means disposed below the locus of passage of gas through the sheet for collecting the finely divided particles together into a mass thereof.

The hot gas dispersing means can include a heating chamber, a heater within said chamber, means defining an opening for passage of gas into said chamber for the heating thereof, and conduit means communicating with the heating chamber and having an outlet disposed for delivery of hot gas for said passage through the sheet. Preferably, the heater is a natural draft heater.

In the preferred apparatus of the invention, the dispersing means for providing the dispersed particles comprises a hopper in combination with a dispersing roll.

The hopper is provided with an elongated, rectangular, bottom outlet, and a dispersing roll is located at the outlet for dispensing finely divided material from the hopper as a dispersion in the form of a sheet. Another means which can be used for dispersing is a vibrating conveyor arranged so that the desired sheet forms at the discharge end of the conveyor.

The invention is further described in reference to the accompanying drawings, wherein:

FIG. 1 is an elevation view in cross-section depicting one form of apparatus according to the invention;

FIG. 2 is a view of the equipment shown in FIG. 1, taken along line 2—2 in FIG. 1;

FIG. 3 is a cross-sectional view taken along line 3—3 in FIG. 1;

FIG. 4 is a cross-sectional view taken along line 4—4 in FIG. 1.

FIG. 5 is an isometric view of a portion of the equipment shown in FIG. 1;

FIG. 6 is an elevation view indicating a modified form of apparatus according to the invention, and in which form a dispersing roll is used for providing the finely divided material in the form of a sheet;

FIG. 7 is an elevation view of the equipment shown in FIG. 6, taken along line 7—7 in FIG. 6;

FIG. 8 is an elevation view of a portion of a dispersion roll as can be used in the apparatus of the invention;

FIG. 9 and FIG. 10 are schematic representations, respectively, of resin particles before and after the treatment according to the invention, the particles being shown oversized in order to better illustrate the changes which occur during the treatment of the invention.

Referring to FIGS. 1–5 of the drawing, the invention provides apparatus for dispensing hot gas. This apparatus includes a heating chamber 11 made up of a cylindrical shell 12 and a hot gas delivery conduit 13. A reducing section 14 interconnects the cylindrical shell 12 and the delivery conduit 13. Within the cylindrical shell 12, there is disposed a gas burner 15, and gas supply line 16 outfitted with a control valve 17 is connected to the burner. To provide air for the combustion, the cylindrical shell 12 is maintained elevated from the floor 19 by the short legs 18.

Disposed above the heating chamber 11 is a vibrating conveyor 21, and disposed below and to the right of the hot gas dispensing means discharge conduit 13, is a collecting hopper 24. The collecting hopper 24 is mounted on legs 25 and is provided with a transfer means such as the conveyor 26.

The operation of the apparatus involves the dispensing of material to be treated according to the invention by the vibrating conveyor 21 so that it falls as a sheet from the discharge end 22 of the conveyor toward the discharge end 23 of the hot gas dispensing means discharge conduit 13. The discharge end 22 of the vibrating conveyor 21 is positioned relative to the discharge end 23 of the discharge conduit 13, so that the material discharged by the vibrating conveyor falls close to but in front of the delivery conduit discharge end 23.

Gas is supplied to the gas burner 15 and air by natural draft is drawn in through the space 30 provided by the elevated condition of the hot gas dispensing means 11 above the floor 19. A flame 33 provides the hot gas which rises through the heating chamber to the discharge end 23 of the delivery conduit 13. The hot gas then passes through the material falling in front of the discharge end 23 of the delivery conduit 13.

The vibrating conveyor 21 serves to disperse the particles and as the particles fall through the hot gas stream, they are heated so that the surfaces thereof are softened and the protuberances of the particles are reduced. The hot gas stream tends to carry the particles with it and the smaller particles, of course, are carried further along with the gas stream than are the larger particles. Thus, the sheet of particles is expanded into a three-dimensional dispersion of the dispersed particles and as the dispersion passes through the gas stream it is expanded so that the distances separating the particles continuously increase. Hence, as the particles are heated to a higher and higher temperature, the distances separating the particles are increased so that the likelihood of agglomeration is decreased. The hopper 24 is positioned so that it serves to collect the particles following their passage through the gas stream. The material collected in the hopper 24 constitutes the material treated according to the invention, and is a relatively free flowing mass of the particles of the thermoplastic material worked. The conveyor 26 serves to transfer the treated pulverulent free flowing material to a point for packaging or for use.

In a low capacity embodiment of the apparatus shown in FIGS. 1–5, the height of the cylindrical portion 12 of the hot gas dispensing means 11 can be 24 inches, the I.D. of this cylindrical member can be 12 inches, the distance from the top of the cylindrical member 12 to the top of the delivery conduit discharge opening 23, about 18 inches, the hot gas dispensing means can be elevated about 1 inch from the floor, and the outlet 23 of the discharge conduit 13 can be of rectangular form and about 5 inches wide by about 3 inches high. The hopper 24 can be positioned at least about 2 feet below the lower edge of the delivery conduit outlet opening 13.

Another form of apparatus according to the invention is indicated in FIG. 6 and FIG. 7. In this embodiment, instead of using a vibrating conveyor 21, a dispersing roll is used. A hopper 36 having an elongated rectangular discharge bottom opening 37 is provided with a dispersing roll 38 at the discharge opening 37. The dispersing roll 38 is journaled in bearing blocks 39 and a pulley drive 40 is provided for rotating the dispersion roll. The length of the discharge opening 37 of the hopper 36 is made somewhat, for example, 2 inches shorter than the corresponding dimension of the discharge conduit outlet opening 23, so that the material discharged by the dispersion roll will all fall through the gas stream issuing from the discharge conduit outlet 23.

The dispersion roll as is used in the embodiment of FIG. 6 and FIG. 7, is of the type known for use in feeding material in dispersed form to roller mills for grinding. The surface of the dispersion roll as is generally true for such apparatus, is formed with spaced depressions to facilitate the operation of the roll in working material out of the hopper to a sheet of the material in which the particles are dispersed. This condition of the roll is indicated in FIG. 8. The roll can be formed of sheet metal which has circumferentially spaced grooves 43. These grooves are about 1/32 inch deep, about 1/4 inch in axial length and spaced about 1/4 inch. Such a roll can be provided by forming spaced grooves to a depth of about 1/4 inch in a piece of sheet metal and then forming the sheet into a roll, whereupon the depth of the grooves is reduced.

The apparatus represented in FIG. 6 and FIG. 7 is well suited for commercial size equipment. The dispersion roll can be 5 inches in diameter by 46 inches long, can be rotated at 70 r.p.m. or higher, for example 100 r.p.m. Feed rates of 700 lbs. per hour can be conveniently obtained with a dispersion roll of these dimensions, and at the r.p.m. indicated.

In the operation of apparatus as is depicted in FIGS. 6 and 7, hot gas is supplied in the manner described with reference to the embodiment of FIG. 1. Finely divided, thermoplastic material contained in the hopper 36 for treatment according to the invention, is dispersed with the dispersion roller and drops from the high level of the dispersion roller to a lower level where it can be collected in a hopper, as is shown in FIG. 1. During its drop from the dispersion roll to the collecting means, a hot gas stream is passed through the falling sheet of the finely divided material, whereupon the particles are heated and the change in surface characteristics thereof as occasions the improvement in flowability according to the invention occurs.

The material treated with the apparatus of the invention, can be pulverized material as is produced in known pulverizing operations conducted at normal temperature to provide the thermoplastic resin in finely divided form of particle size such as, for example, 100% —12 mesh, 10% —100 mesh; 100% —5 mesh, 25% —150 mesh; or 100% —80 mesh, 10% —200 mesh.

In referring to the use of normal temperature in the pulverizing, it is meant to distinguish from low temperature size reduction operations, as for example the size reduction of resin in the presence of liquid nitrogen. In the pulverizing of material to produce a finely divided material for treatment according to the invention, temperature rise above normal temperature may occur as an incident of the pulverizing operation, such as pulverizing in a disc mill. Such pulverizing operations are here considered as "normal" temperature pulverizing operations.

The form or shape of pulverized resin for treatment in the procedure of the invention is depicted in FIG. 9, wherein enlargements of such particles are shown. It will be observed that these particles 45 have protuberances 46 and are characterized by a roughened surface. Upon passing such particles through a heated gas stream, the particles being dispersed so that substantial contacting of the particles during the contacting with the gas stream does not occur, the particles are heated so that the surfaces thereof are softened and flow occurs at the surfaces, whereupon a smoothening of the surface results.

The extent to which the protuberances are removed depends, of course, on the length of time and gas temperature applying for the contacting. It is not essential that the protuberances be completely removed in order to realize improvement in flow properties according to the invention.

During the contacting with gas, agglomeration of the particles does not occur to any substantial extent. This is surprising since the gas stream moves through the dispersed particles and it would be expected that due to the influence of the gas stream on motion of the particles, the various particles would be brought into contact so that agglomeration would occur. That the gas does cause movement of the particles is apparent since as the particles fall through the gas stream, they are moved in the direction of the gas stream in an arcuate path. The smaller the particles, the greater the effect of the gas stream in distorting the path of the particles from the vertical. As discussed above, tendency for agglomeration is reduced because the gas stream tends to separate the particles, since as the particles move through the gas stream, the collective form of the particles is expanded so that as the particles fall through the gas stream the extent to which the particles are separated is increased.

An important aspect of the invention is that the particles be cooled following the heating in the gas stream and before the collection thereof into a mass of pulverized material. As indicated above, in the utilization of the apparatus depicted in the drawings, a fall of about two feet following passage through the gas stream is enough to provide the desired cooling. This applies particularly to polyethylene. The required drop for the cooling can be readily determined for the conditions applying in the particular application of the invention involved.

Following passage through the gas stream and cooling, the particles have the form depicted in FIG. 10. As is here shown, the particles 45 have smoothened surfaces 47 and the protuberances have been eliminated or reduced.

The particles as are depicted in FIG. 10 differ from heretofore known plastic resin particles in that they have a smooth glazed surface and have improved flow properties. In general, the particle size of the smooth-surface particles will be about the particle size for the pulverized material treated according to the invention to provide the smooth-surface particles, and the smooth-surface particles of the invention are less than about 5 mesh.

The flowability of the finely divided material of the invention can be measured with the aid of a laboratory funnel, and improvement can be determined by comparative tests using the funnel. Thus, using a Kimax 29020 powder funnel having a diameter at the top of 100 mm., a stem length of 25 mm., and a stem I.D. of about 14 mm., can be utilized to measure the flowability of 50 g. samples of the material. The time required for emptying the funnel is an indication of the flowability of the material. In general, the invention provides an improvement of about 20–40% relative to the flowability of the particles in the pulverized condition before treatment according to the invention. For example, using a funnel of the type specified, and measuring the flowability of the starting material and the product of Example 1, set forth hereinafter, the time for the starting material was about 7 seconds (6.5–7.5), and the time for the product was about 5 seconds (4.5–5). Thus, the improvement in flowability was 2 seconds or 28.5%.

Improvement in flowability is also indicated by reduction in the angle of recline. Thus, the angle of recline of the starting material can be about 60–70° and the angle following the treatment according to the invention, about 40–50°. A reduction of about 20% is desirable and can be conveniently obtained by the method of the invention.

In utilization of the finely divided material produced according to the invention, the material is caused to flow and the benefits of the treatment of the invention are then realized. For example, in the case of utilization of the material for rug backing, the improved flowability of the product provided by the invention greatly facilitates the spreading of the finely divided material over the back of the rug as is practiced in application of the resin to the rug. In the case of fluid bed coating or other operations wherein the resin is provided as a fluidized bed, the pulverized material as is used as starting material in the procedure of the invention is generally unsatisfactory in that transition of the material from a bed at rest to a fluidized condition (which is effected by passing a gas stream through the bed) is complicated by the fact that the transition is not made gradually, and the gas tends to blow through the finely divided material. Utilizing finely divided material as is produced according to the invention, the transition can be made gradually and without difficulty. Similarly, in other procedures such as slush molding, rotational molding, and coloring, the benefits according to the invention are realized as the mass of material is caused to flow in the practice of such procedures.

The invention is further described in the following examples.

EXAMPLE 1

Low density polyethylene of melting index about 20 was treated in apparatus as is described in reference to FIG. 1. The particle size of the starting material was 100% —12 mesh, 12% —50 mesh, and the material treated was U.C.C. D.P.D. 9200. The laboratory feeder utilized was an Eriez 40–A having a tray 5 inches wide by 26 inches long. The feed rate of the starting material was 50 lbs. per hour. The temperature at the outlet of the gas discharge conduit (gas temperature) was about 600° F. The product of this treatment had the flowability described hereinbefore and is of a nature as to be generally useful in services as are referred to above. Instead of the polyethylene used in this example, other polyethylene resins having melting index of about 2–70, can be used.

EXAMPLE 2

The procedure described above, in Example 1 was followed, except that high density polyethylene was used. The particle size of the starting material was 100% — 50 mesh, 25% —100 mesh. The results were as was obtained in the case of Example 1.

While the invention has been described with respect to particular embodiments thereof, various modifications and alternative embodiments will be apparent to those skilled in the art and it is desired to secure by these Letters Patent all such embodiments as are within the scope of the invention.

What is claimed is:

1. Apparatus suitable for the treatment of thermoplastic resin in finely divided form to improve the flowability thereof, which comprises:
   (a) dispersing means for dispersing finely divided particles as a falling dispersion thereof in the form of a sheet;
   (b) hot gas dispensing means disposed below said supply means for delivering a stream of hot gas for passage transversely through the plane of said sheet to simultaneously heat and expand the dispersion of particles, said hot gas dispensing means comprising a natural draft heater including a heating chamber, a heater within said heating chamber, means defining an opening for passage of gas into said chamber for the heating thereof and conduit means communicating with the heating chamber and having a horizontally elongated outlet disposed for delivery of hot gas over the width of said sheet for said passage through the body of finely divided particles;
   (c) collecting means for collecting the finely divided particles together into a mass thereof, said collecting means having an open top for passage of the particles thereinto, and being disposed substantially directly below and spaced from the locus of passage of gas through the dispersion of finely divided particles.

2. Apparatus according to claim 1, said dispensing means for dispersing finely divided particles comprising a hopper having an elongated bottom outlet, a dispersion roller mounted at said outlet for dispersing finely divided material from the hopper in said sheet form.

3. Apparatus according to claim 1, said dispensing means being a vibrating conveyor disposed for dispensing finely divided material conveyed thereby from its discharge end in said sheet form.

4. Apparatus according to claim 1, said hot gas dispensing means being disposed for directing said stream of hot gas substantially horizontally through the falling body of dispersed particles.

References Cited by the Examiner

UNITED STATES PATENTS

| | | | |
|---|---|---|---|
| 454,158 | 6/1891 | Swanfeldt | 222—414 |
| 1,175,224 | 3/1916 | Bleecker | 264—15 XR |
| 1,855,214 | 7/1931 | Alton | 222—414 |
| 2,038,251 | 4/1936 | Vogt | 264—15 |
| 2,161,342 | 7/1938 | Francis | 222—199 |
| 2,911,669 | 11/1959 | Beckwith. | |
| 2,976,574 | 3/1961 | Keutgon et al. | 264—15 XR |
| 3,046,607 | 7/1962 | Blaha | 264—15 |
| 3,062,414 | 11/1962 | Morris | 222—199 XR |
| 3,151,965 | 10/1964 | Patterson | 264—15 XR |

ALEXANDER H. BRODMERKEL, *Primary Examiner.*

ROBERT F. WHITE, *Examiner.*

P. E. ANDERSON, F. S. WHISENHUNT,
*Assistant Examiners.*